(12) United States Patent
Margulis

(10) Patent No.: US 7,890,867 B1
(45) Date of Patent: Feb. 15, 2011

(54) VIDEO EDITING FUNCTIONS DISPLAYED ON OR NEAR VIDEO SEQUENCES

(75) Inventor: Vlad Margulis, San Francisco, CA (US)

(73) Assignee: Adobe Systems Incorporated, San Jose, CA (US)

(*) Notice: Subject to any disclaimer, the term of this patent is extended or adjusted under 35 U.S.C. 154(b) by 1288 days.

(21) Appl. No.: 11/449,215

(22) Filed: Jun. 7, 2006

(51) Int. Cl.
*G06F 3/00* (2006.01)
*G11B 27/00* (2006.01)

(52) U.S. Cl. .................. 715/723; 715/202; 386/52; 386/4; 725/41

(58) Field of Classification Search ............ 386/52, 386/4; 715/723.202; 725/41
See application file for complete search history.

(56) References Cited

U.S. PATENT DOCUMENTS

| | | | |
|---|---|---|---|
| 5,404,316 A | | 4/1995 | Klingler et al. |
| 5,544,318 A | | 8/1996 | Schmitz et al. |
| 5,760,767 A | | 6/1998 | Shore et al. |
| 5,999,173 A | | 12/1999 | Ubillos |
| 6,154,600 A | * | 11/2000 | Newman et al. ............ 386/4 |
| 6,204,840 B1 | | 3/2001 | Petelycky et al. |
| 6,400,378 B1 | | 6/2002 | Snook |
| 6,807,361 B1 | | 10/2004 | Girgensohn et al. |
| 6,928,613 B1 | | 8/2005 | Ishii et al. |
| 7,334,190 B2 | * | 2/2008 | Wierowski ............ 715/712 |
| 7,352,952 B2 | | 4/2008 | Herberger et al. |
| 2001/0040592 A1 | | 11/2001 | Foreman et al. |
| 2002/0106187 A1 | | 8/2002 | Inoue |
| 2003/0002851 A1 | | 1/2003 | Hsiao et al. |
| 2003/0142955 A1 | * | 7/2003 | Hashizume et al. ......... 386/52 |
| 2003/0215214 A1 | | 11/2003 | Ma |
| 2004/0001079 A1 | * | 1/2004 | Zhao et al. ............. 345/719 |
| 2004/0033632 A1 | * | 2/2004 | Chen et al. ............. 438/14 |
| 2004/0090462 A1 | | 5/2004 | Graham |
| 2004/0131340 A1 | | 7/2004 | Antoun et al. |
| 2004/0263636 A1 | | 12/2004 | Cutler et al. |
| 2005/0071886 A1 | | 3/2005 | Deshpande |
| 2005/0084232 A1 | | 4/2005 | Herberger et al. |
| 2005/0257152 A1 | | 11/2005 | Shimizu et al. |
| 2006/0059426 A1 | * | 3/2006 | Ogikubo ............... 715/723 |
| 2006/0159414 A1 | | 7/2006 | Wolf et al. |
| 2006/0277454 A1 | | 12/2006 | Chen |
| 2007/0033632 A1 | | 2/2007 | Baynger et al. |
| 2008/0077866 A1 | * | 3/2008 | Margulis ............... 715/723 |
| 2009/0158206 A1 | * | 6/2009 | Myllyla ............... 715/804 |

OTHER PUBLICATIONS

U.S. Appl. No. 11/445,040, filed May 31, 2006.
iLife '06, "iMovie HD6," Copyright 2006 Apple Computer, Inc., 4 pages.
Final Cut Studio Cut to the Future, "Motion 2. Advanced Animation. Instant Gratification.", http://www.apple.com/ finalcutstudio/motion/, copyright 2005 Apple Computer, Inc., 4 pages.
Avid Pinnacle Studio Plus 10, release date Sep. 15, 2005, CNET Review, 7 Slides. Troy Dreier, 7 Slides listed as separate pages as 11533738_1avidpinnacle pdf file-11533738_7avidpinnacle pdf file.
RealPlayer 7 Plus Manual, Chapter 7 Jan. 27, 2005, pp. 59-77.
Studio Plus Version 10, User Guide, 4 Figs. 3 pages, release date Sep. 15, 2005.
Adobe Premier 6.0, Review Date: Apr. 30, 2001, Erik Holsinger.

\* cited by examiner

*Primary Examiner*—Thai Tran
*Assistant Examiner*—Helen Shibru
(74) *Attorney, Agent, or Firm*—Robert C. Kowert; Meyertons, Hood, Kivlin, Kowert & Goetzel, P.C.

(57) ABSTRACT

Video editing functions displayed in or near video sequences are described, including displaying a video window including a video sequence of a video presentation, receiving an input to enable an editing panel for performing an editing function for the video sequence, and displaying the editing panel using the video window in response to the receiving.

24 Claims, 5 Drawing Sheets

VIDEO EDITING FUNCTIONS DISPLAYED ON OR NEAR VIDEO SEQUENCES

FIELD OF THE INVENTION

The present invention relates generally to software. More specifically, video editing functions displayed on or near video sequences are described.

BACKGROUND OF THE INVENTION

Video editing is the process of assembling a collection of various media, such as video, audio, and still images into a finished video suitable for viewing. Video editing can be performed using several techniques, one of which is to create digital videos using video editing software on a processing system such as a personal computer.

Video editing software typically includes a graphical interface used to arrange media into a video presentation. The video presentation may then be compiled into a finished video. A user may also use the graphical interface to modify the video presentation by altering the media (e.g., changing the speed of a video clip), or by adding enhancements such as titles, transitions, and narration.

However, an inexperienced user of video editing software may have difficulty appreciating the timing aspect of video editing. For novice users, thinking of a video in terms of time is difficult, which may hinder their ability to create properly edited video content using video editing software.

Thus, what are needed are video editing techniques without the limitations of conventional techniques.

BRIEF DESCRIPTION OF THE DRAWINGS

Various embodiments of the invention are disclosed in the following detailed description and the accompanying drawings.

DETAILED DESCRIPTION

Various embodiments of the invention may be implemented in numerous ways, including as a system, a process, an apparatus, or a series of program instructions on a computer readable medium such as a computer readable storage medium or a computer network where the program instructions are sent over optical or electronic communication links. In general, operations of disclosed processes may be performed in an arbitrary order, unless otherwise provided in the claims.

A detailed description of one or more embodiments is provided below along with accompanying figures. The detailed description is provided in connection with such embodiments, but is not limited to any particular example. The scope is limited only by the claims and numerous alternatives, modifications, and equivalents are encompassed. Numerous specific details are set forth in the following description in order to provide a thorough understanding. These details are provided for the purpose of example and the described techniques may be practiced according to the claims without some or all of these specific details. For the purpose of clarity, technical material that is known in the technical fields related to the embodiments has not been described in detail to avoid unnecessarily obscuring the description.

According to various embodiments, video editing software for creating a video presentation is described. The video editing software may include a video window, in which a video sequence of the video presentation is displayed. The video sequence may be edited using an editing panel that is displayed on or near the video window. The editing panel may be displayed in response to an input selecting a selection area adjacent to the video sequence or in response to the video sequence being inserted into the video presentation. The editing panel may be a timeline to perform time and sequence based editing functions or may be an editing panel including options to modify the video sequence using other editing functions according to various embodiments.

Video Editing Software Including Displaying a Timeline in a Video Window

Figure 1A:
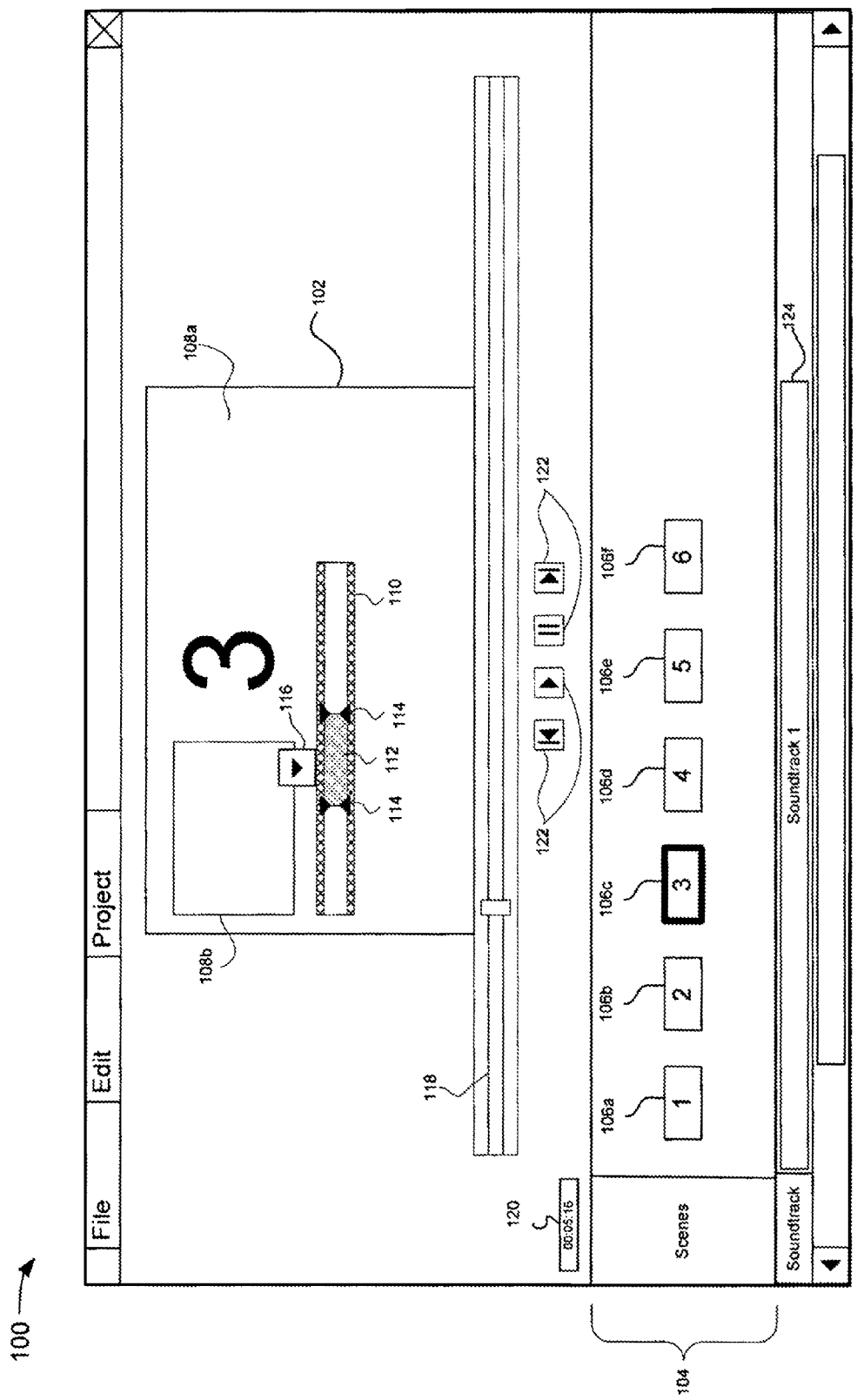
FIG. 1A illustrates video editing software including a timeline displayed on a video window in accordance with an embodiment.

FIG. 1A illustrates video editing software 100 in accordance with an embodiment. The video editing software 100 may be used to assemble a variety of media, such as video, audio, and still images, into a video presentation that may then be compiled into a finished video to be viewed by a user. According to some embodiments, a video sequence, such as an individual video clip, may be part of a video presentation. When the video editing software 100 receives an input (e.g., a mouse click) to enable an editing panel (e.g., a timeline) for performing an editing function for the video sequence, the editing panel for the editing function is displayed on or near the display of the video sequence.

The video editing software 100 includes a video window 102 used to display various still and moving images related to the video presentation. The video window 102 may, for example, display a rendered output of a video presentation including various video sequences, or used to preview portions of a video presentation. A video presentation, according to some embodiments, is a collection of elements, including media clips such as video and audio clips, and enhancements, such as titles and transitions, in an arrangement that may be compiled into a finished video that can then be viewed by a user. The video presentation may be assembled using the video editing software 100, and may be saved by a user to a storage device to be recalled at a later time.

As shown here, displayed in the video window 102 is a scene of the video presentation. A scene may be a portion of the video presentation. Scenes are constructs that may be determined as appropriately suited for a specific application. For example, a scene may include one or more video sequences, or may include portions of one or more video sequences, in addition to other media such as audio clips or still images. A scene may be a distinct portion of the video presentation that is designated by a user or the video editing software 100. Scenes may be displayed in a storyboard 104. The storyboard 104 includes several scenes 106a-106f of the video presentation. The storyboard 104 may also be used for navigation. A user may, for example, select the scene 106c, which is highlighted to indicate that it has been selected (e.g., by a user selecting the scene 106c with a pointing device such as a mouse). The scene 106c or some portion thereof is then displayed in the video window 102.

An editing function, as used herein, is a routine that allows a user to make modifications to a video sequence or video presentation. For example, an editing function may be performed using a timeline, such as trimming a video sequence or moving a video sequence within a video presentation. Alternatively, an editing function may modify a video sequence (e.g., lightening or darkening it). The visual manifestation of these editing functions is an editing panel, which allows a user to see what editing functions are available and to exploit the editing functions. For example, an editing panel may be the visual representation of a timeline, or a button that allows a user to modify a video sequence. Although some editing functions and editing panels are described herein, it is understood that any editing function or panel may be used.

The scene 106c, as displayed in the video window 102, includes two video sequences (e.g., video clips) 108a and 108b. The main view of the video presentation is shown in the video sequence 108a. The video sequence 108b is embedded in the video sequence 108a; it is a "picture-in-picture" view. The scene 106c may also include various other video sequences or other media such as audio clips, still images, or narration tracks.

The video sequence 108b has an associated timeline 110 that is shown in the video window 102. The timeline 110 is an editing panel that can be used to perform an editing function. According to some embodiments, the timeline 110 is displayed in the video window 102 and on the video sequence 108a to allow a user to visualize the timing relationship of the video sequence 108b relative to the video presentation. In some embodiments, if a scene contains a single video sequence (i.e., there is one video sequence displayed in or occupying the video window 102), a timeline may be displayed on or near the video sequence (and hence, the video window 102). According to other embodiments, the timeline 110 is displayed adjacent to the video sequence 108b to which it corresponds. According to other embodiments, the timeline may be displayed in other locations in or near the video window 102.

The timeline 110 can be used to edit the video sequence 108b relative to the video presentation. The timeline 110 may, according to some embodiments, represent the entire video presentation or a portion of the video presentation. The timeline 110 may further include a segment 112 that corresponds to the length of the video sequence 108b relative to the entire video presentation. A user may edit the video presentation by, for example, trimming the video sequence 108b using grab handles 114. The user may also move the video sequence 108b within the video presentation by clicking and dragging the segment 112 to a different location within the timeline 110.

The timeline 110 may be enabled or disabled by selecting an area such as a selection area 116. The selection area 116 may resemble a pull-down icon used to activate pull-down windows or menus. When the video editing software 100 receives an input (e.g., a mouse click from a user) to enable or disable the timeline 110, the video editing software 100 may either display (e.g., by drawing) or remove the timeline 110, respectively. According to some embodiments, the timeline 110 for the video sequence 108b is not shown unless a user wishes to make it visible, reducing the complexity of the video editing software 100. Although a timeline 110 is shown in FIG. 1A, other editing functions may be performed using other editing panels. Other editing functions, for example, those shown in FIG. 1B, may also be enabled or disabled according to other embodiments.

The video editing software 100 may include various other features. For example, an overall timeline 118 displays the current position of the video display in the video window 102 relative to the video presentation. The overall timeline 118 may also be displayed simultaneously or substantially simultaneously with the timeline 110, and may always be displayed. The overall timeline 118 shows the current time of the view in the video window 102, while the timeline 110 shows the position of the video sequence 108b relative to the video presentation. Displaying both timelines can improve video editing.

Here, a timer 120 shows the time of the video presentation that the video window 102 is presently displaying. Navigation buttons 122 allow a user to preview the video presentation by playing, pausing, and skipping between scenes of the video presentation. A soundtrack 124 may be played in the background of the video presentation. It is understood that although these specific features are included in the video editing software 100, that various other configurations and additional features of the video editing software 100 may be realized.

According to other embodiments, the video editing software 100 may include multiple views of the timeline 110. A simplified view of the timeline may be the timeline 110, as shown here. An advanced view of the timeline 110 may show other features such as other video sequences and multiple tracks (e.g., video and audio tracks of the video sequence 108b). A user may switch between the simplified and the advanced view using another selection area or another selectable option, such as a menu option. The above-described embodiments may be varied in design, function, and implementation, and are not limited to those shown and described above.

Figure 1B:
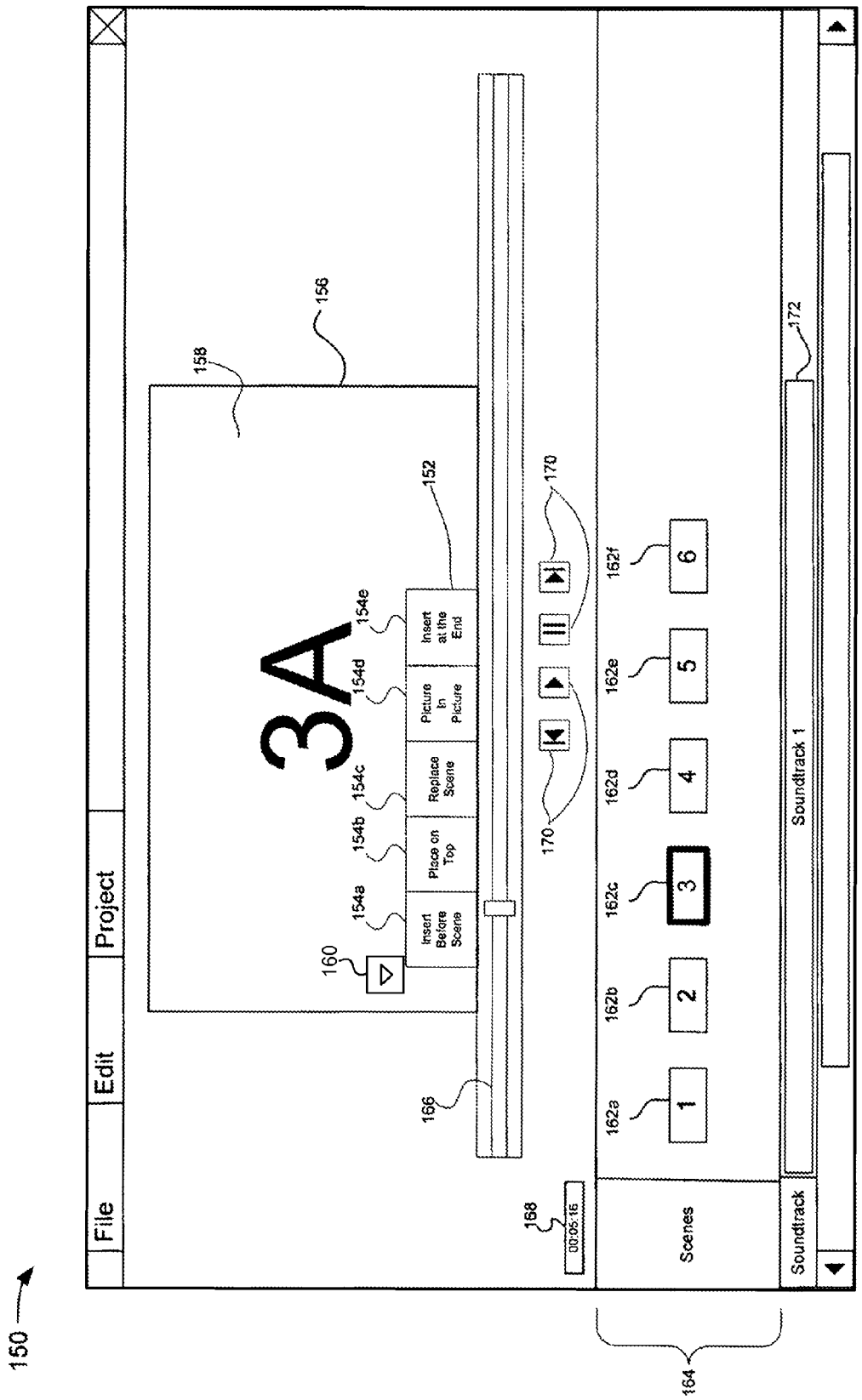
FIG. 1B illustrates video editing software that includes an editing panel with options to modify a video sequence displayed in a video window according to an embodiment.

Video Editing Software Displaying an Editing Panel Including Editing Functions in a Video Window FIG. 1B illustrates video editing software 150 that includes an editing panel with editing functions to modify a video sequence displayed in a video window, according to some embodiments. The editing panel shown in FIG. 1A is the timeline 110 that allows a user to modify a video sequence. The timeline 110 may be enabled or disabled in response to a user input (e.g., selecting an area near the video sequence). The editing panel 152, on the other hand, may include several configurable buttons to activate editing functions for a video sequence. According to various embodiments, an editing panel 152 may be displayed in response to a user input such as selecting an area near a video sequence, or the editing panel may also appear when a video sequence is inserted into a video presentation.

In some embodiments, the editing panel 152 may include several clickable buttons 154a-154e that activate editing functions that may be options to modify a video sequence displayed in a video window 156. The editing panel 152, including the buttons 154a-154e, may appear when a user generates an input to insert a video sequence 158 into the video presentation by, for example, dragging a video clip into the video editing software 100 window. The editing panel 152 may also be enabled by other user inputs, such as a user selecting a selection area 160. The selection area 160 may or may not be present according to various embodiments.

The button 154a may be chosen to insert a video sequence before another scene of the video presentation. For example, the video presentation may include several scenes 162a-162f that are shown in a storyboard 164. The video sequence 156 is a video sequence that has not yet been inserted into the video presentation, and, therefore, is not shown in the storyboard 164. The scene 162*c* is currently selected, and was displayed in the video window 156 before the video sequence 158 was inserted. To insert the video sequence 158, the video sequence 158 may have been dragged into the video window 156, for example. When the video sequence 158 is dragged into the video window 156, the editing panel 152 appears. The button 154*a* may insert the video sequence 158 into the video presentation before the scene that was displayed in the video window 158 prior to insertion.

The button 154*b* may place the video sequence 158 over the scene 162*c*, for example, transposing the video sequence 158 on the scene 162*c*. The button 154*c* may replace the scene 162*c* with the video sequence 158. The button 154*d* may insert the video sequence 158 into the scene 162*c* as a picture-in-picture scene (e.g., as shown in FIG. 1A). In other embodiments, the button 154*e* may insert the video sequence 158 at the end of the video presentation.

It is understood that various other editing functions may be performed using the editing panel 152. For example, the editing panel 152 may include buttons allowing a user to speed up or slow down a video sequence, apply visual effects (e.g., pixelization) to a video sequence, or add titles to a video sequence.

The editing panel 152 may also be enabled or disabled using the selection area 160. A user may enable the editing panel 152 by clicking on the selection area 160 after selecting or inserting the video sequence 158, for example. The editing functions to modify the video sequence 158 available to the user when the user is operating on an existing video sequence of the video presentation may be different than the options available to a user inserting the video sequence into the video presentation. For example, the buttons 154*a*, 154*d*, and 154*e*, which allow a user to choose where the video sequence 158 is inserted, may be excluded.

As with the video editing software 100, the video editing software 150 may include various other features. For example, an overall timeline 166 displays the current position of a video sequence shown in the video window 156 relative to the entire video presentation. A timer 168 shows the time of the video presentation that the video window 156 is presently displaying. Navigation buttons 170 allow a user to preview the video presentation by playing, pausing, and skipping between scenes of the video presentation. A soundtrack 172 may be played in the background of the video presentation. It is understood that although the above-described features may be included in the video editing software 150, other configurations and features of the video editing software 150 may be implemented in other embodiments.

Process for Displaying an Editing Panel in a Video Window

Figure 2:
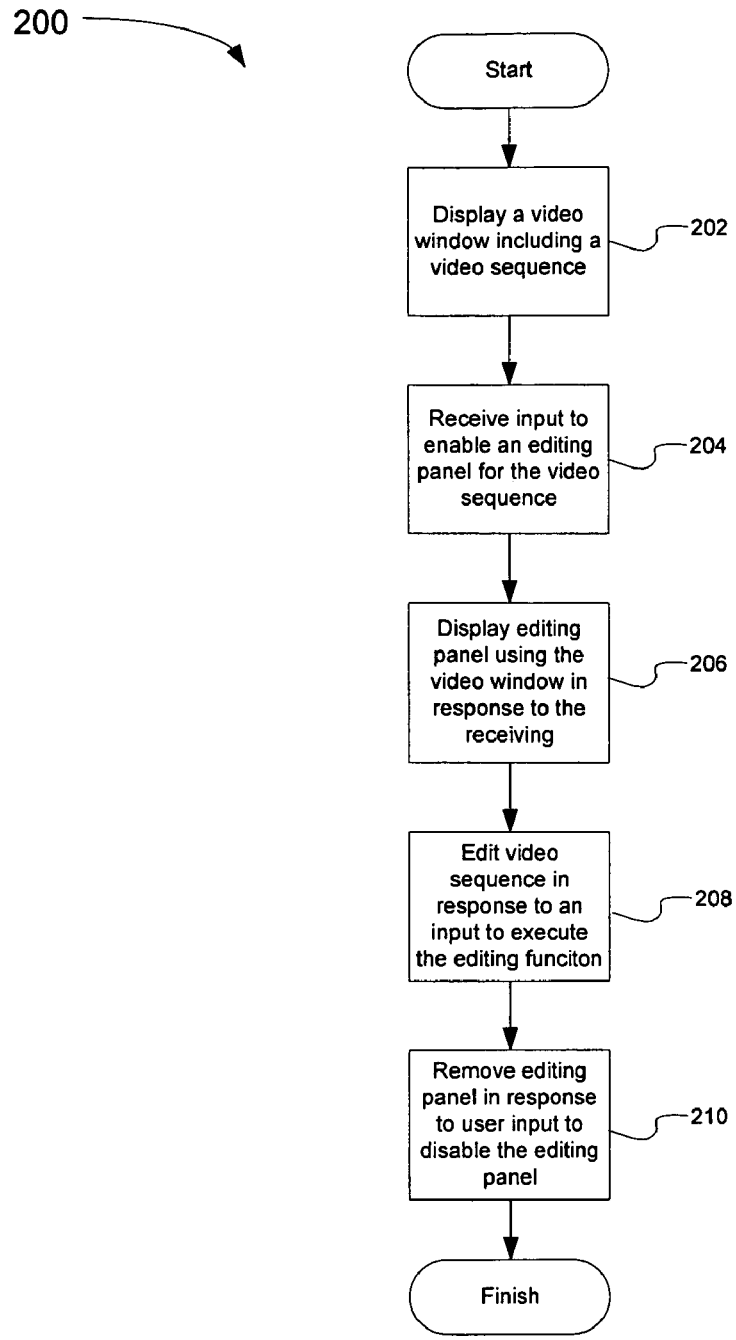
FIG. 2 is a flowchart describing a process for displaying an editing panel on a video window, according to some embodiments.

FIG. 2 is a flowchart describing a process 200 for displaying an editing panel on a video window, according to some embodiments. The editing panel may be a timeline, such as the timeline 110 shown in FIG. 1A or an editing panel with editing functions used for modifying a video sequence (e.g., the editing panel 152 shown in FIG. 1B).

In block 202, a video window including a video sequence of a video presentation is displayed. The video window may be, for example, one of the video windows 102 or 156, as shown above. The video sequence may be displayed individually in the video window or displayed along with other video sequences, as shown in the video window 102. A representative image of the video sequence, such as a selected frame of the video sequence may be displayed, or the video sequence may be played in the video window. In still other embodiments, a video window may be implemented differently and is not limited to the embodiments shown and described above.

In block 204, an input to enable an editing panel for performing an editing function for the video sequence is received. The input may be, for example, a user selection of an area adjacent to the video sequence, such as the selection area 116. A user may choose to enable the editing panel so that the user may perform an editing function, according to some embodiments.

In block 206, the editing panel is displayed using the video window in response to receiving the input. The editing panel may be displayed in or near the video window according to various embodiments. Displaying the editing panel may include, for example, displaying a timeline such as the timeline 110 or displaying an editing panel including various editing functions to modify the video sequence such as the editing panel 152. The editing panel may be displayed adjacent to the video sequence, and may be displayed over the video sequence or over another video sequence, or may be displayed near the video window. Displaying the editing panel in the video window and, in some embodiments, over the video sequence, allows the user to more easily visualize edits that may be made to a video presentation.

In block 208, the video sequence is edited in response to a second input to execute the editing function. The editing function may include, for example, various functions such as trimming the video sequence or inserting the video sequence at a predetermined location, as described above.

In block 210, the editing panel is removed in response to a user input to disable the editing panel. The user input may be selected from, for example, the selection area 116. When the editing panel is disabled, it is no longer displayed in or near the video window. The above-described processes may be varied and are not limited to the examples shown or described above.

Figure 3:
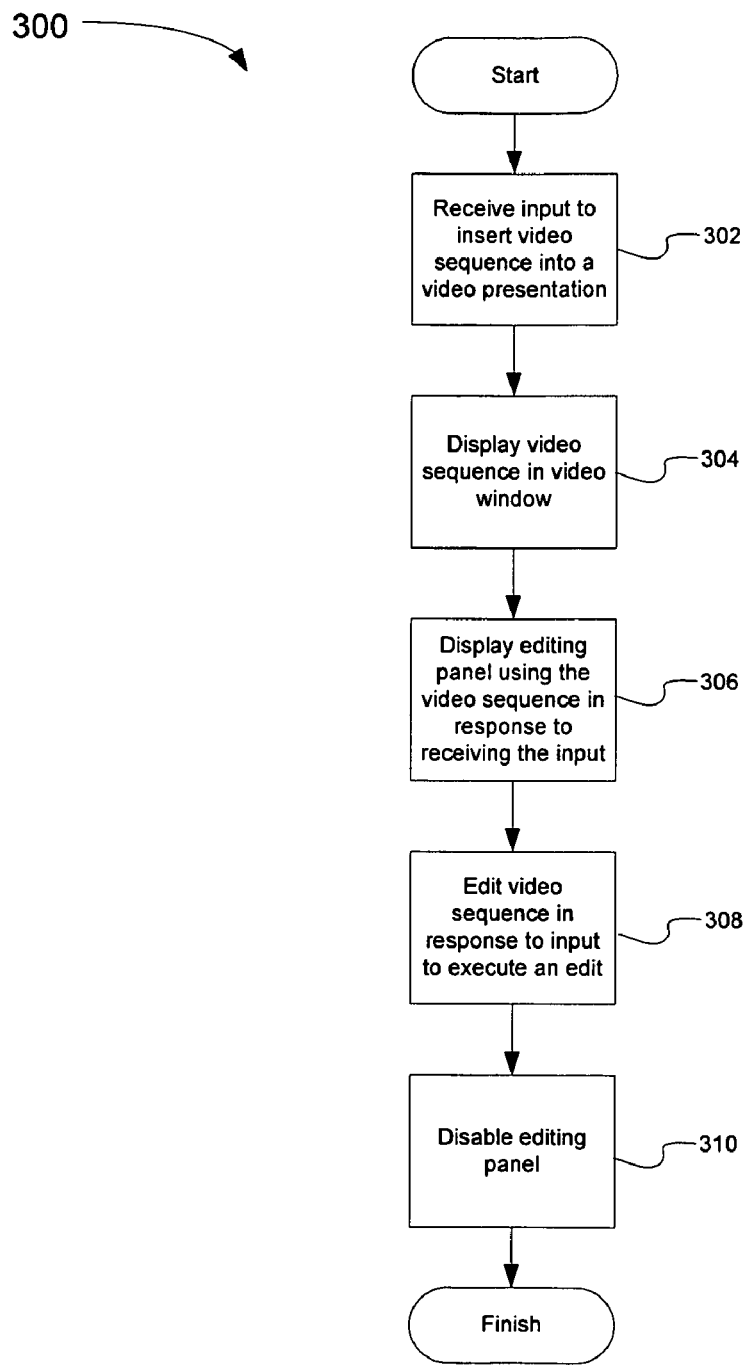
FIG. 3 is a flowchart describing a process for displaying an editing panel in response to inserting a video sequence according to an embodiment.

Process for Displaying an Editing Panel in Response to Inserting a Video Sequence FIG. 3 is a flowchart describing a process for displaying an editing panel in response to inserting a video sequence according to an embodiment. According to a process 300, an editing panel, such as the editing panel 152, may be displayed when a video sequence is inserted into a video presentation. The editing panel may include options to modify the video sequence, according to some embodiments. According to other embodiments, the video sequence may be part of a scene that is inserted into the video presentation.

In block 302, an input to insert a video sequence into a video presentation is received. The input may be, for example, a user input dragging a video sequence (such as a video clip) into a storyboard, a video window, or other area of video editing software, as shown in FIG. 1B.

In block 304, the video sequence may be displayed in a video window. A representative image of the video sequence may be displayed in the window. The representative image may be a frame chosen from the video sequence, for example the first frame of the video sequence. The representative image of the video sequence allows the user to determine the content of the video sequence. The video sequence may alternatively play in the video window.

In block 306, an editing panel is displayed using the video window in response to receiving the input. The editing panel may be displayed in or near the video window, and may also be displayed over or near the video sequence. The editing panel may be, for example, an editing panel including options to modify the video sequence such as the editing panel 152. The editing panel may also be a timeline such as the timeline 110. For example, when the video is inserted, a timeline may also be displayed to allow a user to edit the timeline of the video presentation. A user option may be included in video editing software to determine whether an editing panel including editing functions to modify the video sequence or a timeline is displayed upon insertion of the video sequence.

In block 308, the video sequence is edited in response to a second input to execute an edit. The input may be, for example, selecting one of the buttons 154a-154g. The input may alternatively be a manipulation of a timeline, such as manipulating the drag handles 116 of the timeline 110.

In block 310, the editing panel is disabled. According to some embodiments, the editing panel is disabled and no longer displayed in response to selecting an editing function to modify the video sequence (e.g., selecting one of the buttons 154a-154g). According to other embodiments, the editing panel may be disabled using other techniques, such as selecting a selection area adjacent to the editing panel. The above-described process may be varied and is not limited to the above-described embodiments.

An Exemplary Computer System

Figure 4:
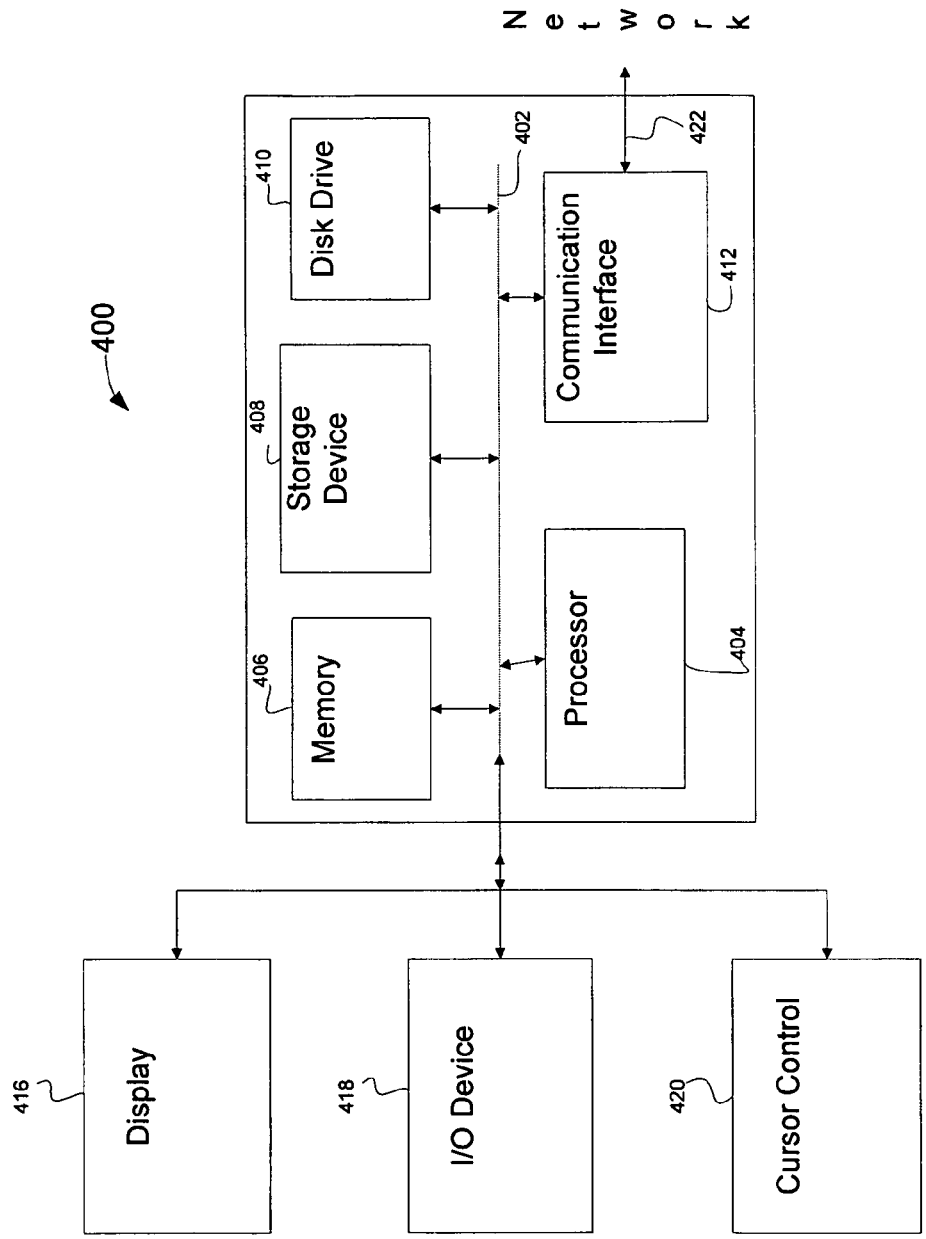
FIG. 4 is a block diagram illustrating an exemplary computer system suitable for enabling video editing functions displayed on or near video sequences, in accordance with various embodiments.

FIG. 4 is a block diagram illustrating an exemplary computer system suitable for enabling video editing functions displayed on or near video sequences, in accordance with various embodiments. In some embodiments, a computer system 400 may be used to implement computer programs, applications, methods, processes, or other software to perform the above-described techniques. The computer system 400 includes a bus 402 or other communication mechanism for communicating information, which interconnects subsystems and devices, such as a processor 404, a system memory 406 (e.g., RAM), a storage device 408 (e.g., ROM), a disk drive 410 (e.g., magnetic or optical), a communication interface 412 (e.g., modem or Ethernet card), a display 414 (e.g., CRT or LCD), an input device 416 (e.g., keyboard), and a cursor control 418 (e.g., mouse or trackball).

According to some embodiments of the invention, the computer system 400 performs specific operations by processor 404 executing one or more sequences of one or more instructions stored in the system memory 406. Such instructions may be read into the system memory 406 from another computer readable medium, such as the static storage device 408 or the disk drive 410. In some embodiments, hard-wired circuitry may be used in place of or in combination with software instructions to implement the invention.

Although the foregoing examples have been described in some detail for purposes of clarity of understanding, the invention is not limited to the details provided. There are many alternative ways of implementing the invention. The disclosed examples are illustrative and not restrictive.

What is claimed:

1. A method, comprising:
    displaying a video preview window, wherein the video preview window is configured to play a video sequence element selected from among multiple elements of a video presentation;
    displaying a selected video sequence element of the video presentation inside the video preview window;
    displaying an editing timeline for the selected video sequence element displayed inside the video preview window, wherein the editing timeline is configured to:
        show the position of the selected video sequence element relative to the video presentation; and
        receive input to perform a time-based editing function for the selected video sequence element relative to other of the multiple elements of the video presentation;
    receiving input to the editing timeline to perform the time-based editing function for the selected video sequence element; and
    performing the time-based editing function for the selected video sequence element relative to the other of the multiple elements of the video presentation, wherein the time-based editing function is performed in response to said receiving the input.

2. The method of claim 1, wherein said displaying the editing timeline is performed in response to receiving input to enable the editing timeline.

3. The method of claim 1, wherein said displaying the selected video sequence element is performed in response to selection of the video sequence element.

4. The method of claim 2, wherein said receiving input to enable the editing timeline comprises receiving user input to the video preview window in an area adjacent to the selected video sequence element displayed inside the video preview window.

5. The method of claim 1, wherein said displaying the editing timeline for the selected video sequence element comprises displaying the editing timeline adjacent to the selected video sequence element displayed inside the video preview window.

6. The method of claim 1, further comprising removing the editing timeline in response to receiving input to disable the editing timeline.

7. The method of claim 1, wherein the input to the editing timeline comprises manipulation of the editing timeline via grab handles.

8. The method of claim 1, further comprising displaying a second timeline representing the entire video presentation, wherein the second timeline displays a current position, relative to the entire video presentation, of the selected video sequence element.

9. The method of claim 1, wherein the time-based editing function for the selected video sequence element comprises one of trimming the selected video sequence element and moving the selected video sequence element within the video presentation.

10. The method of claim 1, wherein said displaying the editing timeline comprises displaying the editing timeline in the video preview window.

11. The method of claim 1, wherein said displaying the editing timeline comprises displaying the editing timeline near the video preview window.

12. A method, comprising:
    displaying a video preview window, wherein the video preview window is configured to play a video sequence element selected from among multiple elements of a video presentation;
    receiving an input to insert the selected video sequence element into the video presentation;
    displaying a selected video sequence element of the video presentation inside the video preview window;
    displaying an editing timeline for the selected video sequence element displayed inside the video preview window, wherein said displaying is performed in response to said receiving the input to insert the selected video sequence element, and wherein the editing timeline is configured to:
        show the position of the selected video sequence element relative to the video presentation; and receive input to perform a time-based editing function for the selected video sequence element relative to other of the multiple elements of the video presentation;

receiving input to the editing timeline to perform the time-based editing function for the selected video sequence element; and performing the time-based editing function for the selected video sequence element relative to the other of the multiple elements of the video presentation, wherein the time-based editing function is performed in response to said receiving the input to the editing timeline.

13. The method of claim 12, wherein the input to the editing timeline comprises manipulation of the editing timeline via grab handles.

14. The method of claim 12, wherein said performing the time-based editing function comprises modifying the selected video sequence element.

15. The method of claim 12, further comprising disabling the editing timeline in response to receiving input to disable the editing timeline.

16. The method of claim 12, wherein the input to insert the selected video sequence element into the video presentation comprises dragging the selected video sequence element into the video preview window.

17. A system, comprising:
a memory configured to store a video presentation; and
a processor configured to perform:
displaying a video preview window, wherein the video preview window is configured to play a video sequence element selected from among multiple elements of a video presentation;
displaying a selected video sequence element of the video presentation inside the video preview window;
displaying an editing timeline for the selected video sequence element displayed inside the video preview window, wherein the editing timeline is configured to:
show the position of the selected video sequence element relative to the video presentation; and
receive input to perform a time-based editing function for the selected video sequence element relative to other of the multiple elements of the video presentation;
receiving input to the editing timeline to perform the time-based editing function for the selected video sequence element; and
performing the time-based editing function for the selected video sequence element relative to the other of the multiple elements of the video presentation, wherein the time-based editing function is performed in response to said receiving the input.

18. The system of claim 17, wherein said displaying the selected video sequence element is performed in response to selection of the video sequence element.

19. The system of claim 17, wherein said performing the time-based editing function comprises modifying the selected video sequence element.

20. The system of claim 17, wherein the input to the editing timeline comprises manipulation of the editing timeline via drag handles.

21. A non-transitory computer readable storage medium storing computer instructions for:
displaying a video preview window, wherein the video preview window is configured to play a video sequence element selected from among multiple elements of a video presentation;
displaying a selected video sequence element of the video presentation inside the video preview window;
displaying an editing timeline for the selected video sequence element displayed inside the video preview window, wherein the editing timeline is configured to:
show the position of the selected video sequence element relative to the video presentation; and
receive input to perform a time-based editing function for the selected video sequence element relative to other of the multiple elements of the video presentation;
receiving input to the editing timeline to perform the time-based editing function for the selected video sequence element; and
performing the time-based editing function for the selected video sequence element relative to the other of the multiple elements of the video presentation, wherein the time-based editing function is performed in response to said receiving the input.

22. The non-transitory computer readable storage medium of claim 21, wherein said displaying the editing timeline is performed in response to receiving input to enable the editing timeline.

23. The non-transitory computer readable storage medium of claim 21, wherein said displaying the selected video sequence element is performed in response to selection of the video sequence element.

24. The non-transitory computer readable storage medium of claim 21, wherein the input to the editing timeline comprises manipulation of the editing timeline via grab handles.

* * * * *